(12) United States Patent
Isono

(10) Patent No.: US 7,466,911 B2
(45) Date of Patent: Dec. 16, 2008

(54) IMAGE TAKING LENS

(75) Inventor: Masashi Isono, Hoi-gun (JP)

(73) Assignee: Konica Minolta Opto, Inc., Hachioji-Shi (JP)

( * ) Notice: Subject to any disclaimer, the term of this patent is extended or adjusted under 35 U.S.C. 154(b) by 401 days.

(21) Appl. No.: 11/449,467

(22) Filed: Jun. 8, 2006

(65) Prior Publication Data

US 2006/0291852 A1 Dec. 28, 2006

(30) Foreign Application Priority Data

Jun. 23, 2005 (JP) .............................. 2005-183088

(51) Int. Cl.
*G02B 7/28* (2006.01)

(52) U.S. Cl. .................. 396/111; 396/439; 359/652; 359/708; 359/716; 359/784; 359/797

(58) Field of Classification Search ................ 396/111, 396/439; 359/652, 708, 716, 784, 797
See application file for complete search history.

(56) References Cited

U.S. PATENT DOCUMENTS

| 6,744,570 | B1* | 6/2004 | Isono ........................ 359/772 |
| 6,977,779 | B2 | 12/2005 | Shinohara | |
| 6,980,372 | B1 | 12/2005 | Do | |
| 2003/0193605 | A1 | 10/2003 | Yamaguchi | |
| 2004/0212901 | A1 | 10/2004 | Nanba et al. | |
| 2005/0002116 | A1 | 1/2005 | Nakamura | |
| 2005/0275950 | A1 | 12/2005 | Kubota et al. | |
| 2006/0092529 | A1* | 5/2006 | Zeng et al. ................... 359/784 |
| 2006/0198630 | A1* | 9/2006 | Isono ......................... 396/439 |
| 2008/0024880 | A1* | 1/2008 | Tang .......................... 359/716 |
| 2008/0170297 | A1* | 7/2008 | Shinozawa ................... 359/652 |

FOREIGN PATENT DOCUMENTS

| JP | 2004-219807 (A) | 8/2004 |
| JP | 2004-317743 (A) | 11/2004 |
| JP | 2005-010622 9A) | 1/2005 |

* cited by examiner

*Primary Examiner*—W. B. Perkey
*Assistant Examiner*—Michael A Strieb
(74) *Attorney, Agent, or Firm*—Sidley Austin LLP

(57) ABSTRACT

An image taking lens forming an optical image on an solid-state image pickup element according to the present invention, is provided with, in order from an object side thereof: a first lens with a positive power; a second lens with a negative power; and a third lens with a negative power. Third lens includes an image side surface in an aspheric shape such that a region around an optical axis in the aspheric shape is formed in a concave shape facing an image side of the image taking lens and a peripheral region in the aspheric shape surrounding the region around the optical axis is formed in a convex shape facing the image side of the image taking lens. The image taking lens fulfills a predefined conditional formula.

7 Claims, 4 Drawing Sheets

IMAGE TAKING LENS

This application is based on Japanese Patent Application No. 2005-183088 filed on Jun. 23, 2005, in Japanese Patent Office, the entire content of which is hereby incorporated by reference.

TECHNICAL FIELD

The present invention relates to an image taking lens, and in particular, to an image taking lens for a high-performance and compact solid-state image pickup element that is suitable for a digital input device (digital still camera, digital video camera and others) that takes in an image of a photographic object by the use of a compact solid-state image pickup element.

BACKGROUND

Recently, with the spread of personal computers, a digital still camera and a digital video camera (hereinafter referred to simply as "digital cameras") which can take image information easily into a digital device are coming into wide use on an individual user level. The digital camera of this kind is expected to grow popular more and more as an input device for image information, in the years to come.

Further, downsizing of a solid-state image pickup element such as CCD (Charge Coupled Device) carried by a digital camera has been advanced, whereby, the digital camera is also required to be further downsized. Therefore, an image taking lens that occupies the largest space in a digital input device is also required strongly to be compact.

The easiest way to downsize an image taking lens is to make a size of the solid-state image pickup element small, and for this reason, a size of a light receiving element is required to be small. As the result, it increases a difficulty of manufacturing the solid-state image pickup element and increases performance to be required for the image taking lens.

On the other hand, when a size of the image taking lens is made small with a size of the solid-state image pickup element unchanged, a position of an exit pupil gets nearer to an image plane inevitably, and an off-axis light flux emerging from the image taking lens enters an image plane obliquely. As a result, it becomes difficult for the light-converging capability of a micro-lens provided on the front surface of the solid-state image pickup element to be exhibited sufficiently, resulting in a problem that an extreme difference in terms of image brightness is observed between a central portion of the image and a peripheral portion of the image. For this reason, a position of an exit pupil of the image taking lens needs to be arranged to be away from an image plane, which makes it difficult to avoid a large-sized image taking lens.

Further, in recent years, it has been required to manufacture at low cost an image taking lens capable of coping with high density of a solid-state image pickup element.

For the aforesaid requirement, there has been disclosed an image taking lens for a solid-state image pickup element provided with three lenses whose power (which expresses an amount defined by with an inverse number of a focal length) are made to be positive, negative and positive respectively and an aperture stop arranged on closest to the object side of the image taking lens (for example, see U.S. Patent Application Publication Nos. 2003/0193605, 2004/0212901 and 2005/0002116, U.S. Pat. No. 6,977,779, Japanese Patent Application Publication Nos. 2004-219807, 2004-317743 and 2005-10622). There is further disclosed an image taking lenses for a solid-state image pickup element provided with three lenses whose powers are made to be positive, negative and negative respectively and an aperture stop arranged between the lens with the positive power and the lens with the negative power (for example, see U.S. Patent Application Publication No. 2005/275950 and U.S. Pat. No. 6,980,372).

However, the former conventional image taking lens provides only one negative lens as the second lens (a lens that is second from the object side), and power of the negative lens becomes too strong. It is therefore estimated that sensitivity against manufacturing errors for the lens optical axis becomes high, and it is difficult to manufacture while keeping peripheral optical performance.

Further, since the latter conventional image taking lens provides an aperture stop located inside the optical system, a distance from the image plane to the position of an exit pupil for the total image taking lens is too short, therefore, the aforesaid image taking lens is not preferable as an image taking lens for a solid-state image pickup element.

SUMMARY

The present invention has been achieved, in view of the aforesaid situation, and its object is to provide a low cost and compact image taking lens having excellent optical performance for a solid-state image pickup element.

The above problems are solved by providing image taking lenses as followings.

There is provided an image taking lens forming an optical image on an solid-state image pickup element and the image taking lens is provided with, in order from an object side thereof: an aperture stop; a first lens with a positive power; a second lens with a negative power; and a third lens with a negative power. The third lens is provided with an image side surface in an aspheric shape such that a region around an optical axis in the aspheric shape is formed in a concave shape facing an image side of the image taking lens and a peripheral region in the aspheric shape surrounding the region around the optical axis is formed in a convex shape facing the image side of the image taking lens. The image taking lens fulfills a following conditional formula:

$$-0.48 < f/f3 < -0.02,$$

where f is a focal length of a total system of the image taking lens, and f3 is a focal length of the third lens.

There is provided another image taking lens forming an optical image on an solid-state image pickup element, and the image taking lens is provided with, in order from an object side thereof: a first lens with a positive power; a second lens with a negative power; and a third lens with a negative power. The third lens is provided with an image side surface in an aspheric shape such that a region around an optical axis in the aspheric shape is formed in a concave shape facing an image side of the image taking lens and a peripheral region in the aspheric shape surrounding the region around the optical axis is formed in a convex shape facing the image side of the image taking lens, and the image taking lens fulfills following conditional formulas:

$$0.01 < f2/f3 < 0.29,$$

$$0.1 < (r11+r12)/(r11-r12) < 1.0,$$

where f2 is a focal length of the second lens, f3 is a focal length of the third lens, r11 is a curvature radius of an object side surface of the first lens and r12 is a curvature radius of an image side surface of the first lens.

Where, "a region around an optical axis in the aspheric shape is formed in a concave shape facing an image side" means that a central portion of the lens surface closer to the image side is in a concave shape facing the image side of the image taking lens and having rotated shape around the optical axis. Further, "peripheral region" means a portion that is outside of an inflection point (out side means the farther side from the optical axis) on a certain lens surface. The inflection point means, for example, a point where the sign of a curvature radius changes on a form changing from a convex shape facing the object side to a concave shape facing the object side. Specifically, it is assumed that a sign of a curvature radius on the convex shape facing the object side is made positive and a sign of a curvature radius on the concave shape facing the object side is made negative. When a certain lens has a surface in which a convex shape is changed to a concave shape (or, a concave shape is changed to a convex shape), the point where the sign of the curvature radius changes from positive to negative (or from negative to positive) is the inflection point on that lens surface.

Further, "such that a region around an optical axis in the aspheric shape is formed in a concave shape facing an image side of the image taking lens and a peripheral region in the aspheric shape surrounding the region around the optical axis is formed in a convex shape facing the image side of the image taking lens" means that a central portion of a lens surface on the image side is in a concave shape facing the image side and having a rotated shape around the optical axis, and a portion outside of the inflection point is in a shape that the curvature radius of the lens surface on the image side provides a sign being opposite to that at the central portion of the lens surface (namely, the portion provides a convex shape facing the image side).

The present invention allows manufacturing lenses with maintaining optical performance of the peripheral region without increasing manufacture error sensitivity for an optical axis of the lens and provides a high-performance image taking lens at low cost with less labor hour.

Further, the present invention provides an optical system without an aperture stop therein, whereby, provides an appropriate distance from an image plane to a position of an exit pupil as an image taking lens for an solid-state image pickup element. Therefore, the present invention provides an image taking lens capable of coping with downsizing and compactness.

As stated above, the present invention provides a low cost and compact image taking lens having excellent optical performance for a solid-state image pickup element.

Further, the image taking lens according to the invention contributes to high performance and compactness of an image taking optical system such as a digital camera by applying the image taking lens to the camera.

DETAILED DESCRIPTION OF THE PREFERRED EMBODIMENTS

Figure 1:
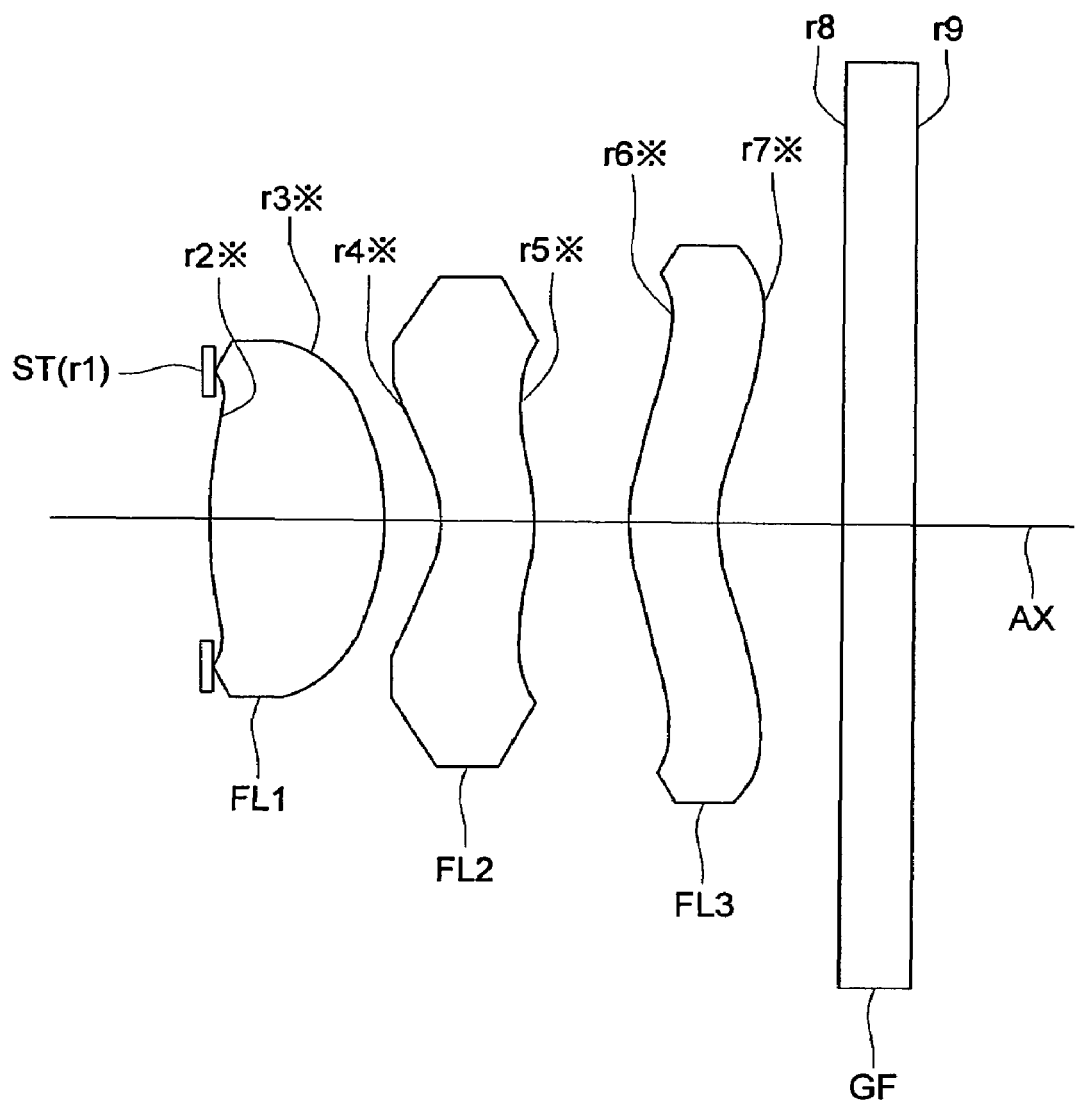
FIG. 1 is a diagram showing lens arrangement of Example 1 representing an example of the embodiment of the invention.
Figure 2:
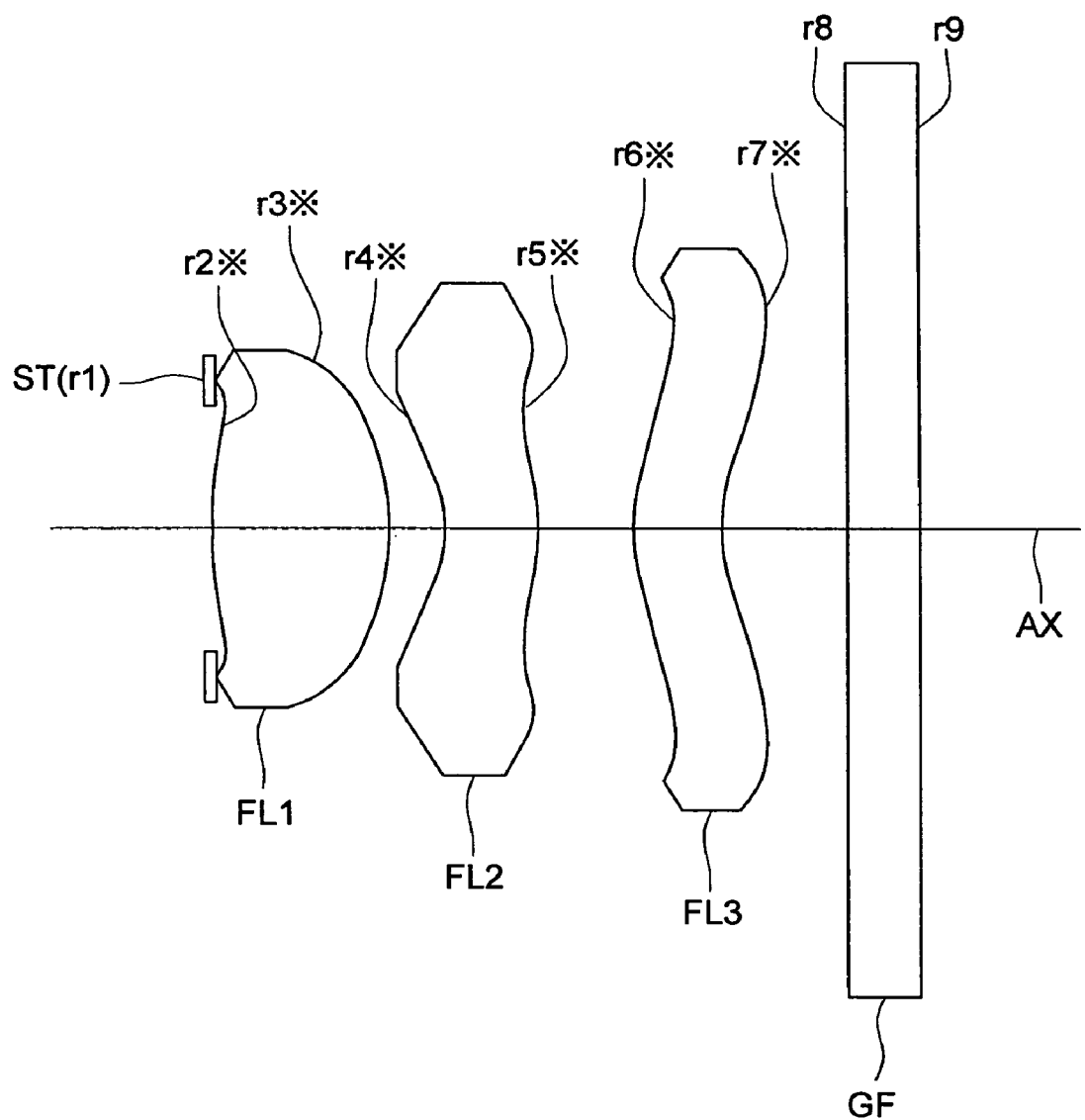
FIG. 2 is a diagram showing lens arrangement of Example 2 representing an example of the embodiment of the invention.

Embodiments according to the present invention will be explained as follows, referring to the drawings. FIG. 1 shows a configuration of the image taking lens of Example 1 of the embodiment according to the present invention, and FIG. 2 shows a configuration of the image taking lens of Example 2 of the embodiment according to the present invention. Each image taking lens of each example is a single-focal-length lens for image taking (for example, for digital camera) which forms an optical image on a solid-state image pickup element (for example, CCD). Each image taking lens is formed of an aperture stop (ST) and three lenses including positive first lens (FL1), negative second lens (FL2) and negative third lens (FL3) in this order from the object side, and parallel-flat-shaped glass filter (GF) corresponding to optical low pass filter and an infrared (IR) blocking filter are arranged on the image side of the lenses. Meanwhile, the surface marked with ri (i=1, 2, 3, . . . ) is the $i^{th}$ surface when it is numbered from the object side, and the surface marked with * which follows ri is in an aspheric surface form in each lens arrangement diagram (FIG. 1 and FIG. 2).

More particularly, an image taking lens of each of Examples 1 and 2 has therein aperture stop (ST), first lens (FL1) in bi-convex shape having a large curvature on the image side, negative meniscus-shaped second lens (FL2) having a concave surface facing the object side, negative meniscus-shaped third lens (FL3) having a concave surface facing the image side, and glass filter (GF), in this order from the object side. Each of opposite sides (r2 and r3) of the first lens (FL1), opposite sides (r4 and r5) of the second lens (FL2) and opposite sides (6 and r7) of the third lens (FL3) is in an aspheric shape.

Aperture stop (ST) is preferably provided on the object side of the first lens as shown in the embodiments according to the present invention. This provides an effect to keep an exit pupil position at a distance from the image side even when the total length of the optical system is shortened. Further, the positive first lens (FL1) and the negative second lens (FL2) are preferably arranged in this order from the object side of the image taking lens. This arrangement provides a telephoto-type lens structure approximately, and thereby intends to realize shortened total length of the image taking lens.

Further, it is preferable that the third lens is a negative lens whose image side surface is in an aspheric shape, and that a region around an optical axis in the aspheric shape is formed in a concave shape facing an image side of the image taking lens and a peripheral region in the aspheric shape surrounding the region around the optical axis is formed in a convex shape facing the image side of the image taking lens. This provides an effect to keep an exit pupil position at a distance from the image side on the convex-shaped surface on the peripheral region, while shortening the total length of the image taking lens on the concave surface on the region around the optical axis.

It is therefore preferable that the image taking lens is provided with aperture stop (ST), and three lenses including positive first lens (FL1), negative second lens (FL2) and negative third lens (FL3) in this order from the object side. It is further preferable that the image side surface of the third lens in the image taking lens is in an aspheric shape, and a region around an optical axis in the aspheric shape is formed in a concave shape facing an image side of the image taking lens and a peripheral region in the aspheric shape surrounding the region around the optical axis is formed in a convex shape facing the image side of the image taking lens.

Next, a conditional expression to be fulfilled by the image taking lens of the embodiments according to the present invention will be explained. Herein, the image taking lens of the embodiments does not need to fulfill all conditional expressions shown below simultaneously, and the image taking lens independently fulfilling each conditional expression achieves corresponding effects. However, it is naturally preferable from the viewpoint of downsizing and assembling that it a plurality of conditional expressions are fulfilled.

It is preferable that an image taking lens according to the present invention fulfills the following conditional expression (1):

$$-0.48 < f/f3 < -0.02 \qquad (1)$$

Where, f represents a focal length of the total system of the image taking lens, and f3 represents a focal length of the third lens.

The above conditional expression (1) is provided for keeping a proper balance mainly between telecentricity and manufacture error sensitivity concerning the power of the third lens.

When the value of the conditional expression (1) exceeds its lower limit, an exit pupil position results in an appropriate distance from the image side, which provides an image taking lens properly working with a solid-state image pickup element. When the value of the conditional expression (1) is lower than its upper limit, manufacture error sensitivity becomes appropriate and deterioration of aberration is properly restrained.

It is further preferable that the image taking lens according to the present invention fulfils the following conditional expression (1A):

$$-0.32 < f/f3 < -0.02 \qquad (1A)$$

Further, it is preferable that the image taking lens according to the present invention fulfils the following conditional expression (2):

$$0.01 < f2/f3 < 0.29 \qquad (2)$$

Where, f2 represents a focal length of the second lens and f3 represents a focal length of the third lens.

The above conditional expression (2) is provided for keeping a proper balance mainly between telecentricity and manufacture error sensitivity concerning the power of the second lens and the third lens.

When the value of the conditional expression (2) is lower than its upper limit, an exit pupil position results in an appropriate distance from the image side, which provides an image taking lens properly working for solid-state image pickup element. When the value of the conditional expression (2) exceeds its lower limit, manufacture error sensitivity becomes appropriate, and deterioration of aberration is properly restrained.

It is further preferable that the image taking lens according to the present fulfils the following conditional expression (2A):

$$0.02 < f/f3 < 0.25 \qquad (2A)$$

Further, it is preferable that the image taking lens according to the present invention fulfils the following conditional expression (3):

$$0.1 < (r11+r12)/(r11-r12) < 1.0 \qquad (3)$$

Where, r11 represents a curvature radius on the object side surface of the first lens, and r12 represents a curvature radius of the image side surface of the first lens.

The aforesaid conditional expression (3) is provided to specify a form of the first lens, and is provided, in particular, to keep an appropriate balance between an optical performance and astigmatism.

When the value of the conditional expression (3) is lower than its upper limit, the astigmatism is made to be on an excellent condition, and a total length of the image taking lens is not increased. When the value of the conditional expression (3) exceeds its lower limit, the total length of the image taking lens is shortened, and furthermore, astigmatism is controlled to be in an appropriate size. Thus, deterioration of aberration is properly restrained.

Further, it is more preferable that the image taking lens according to the present invention fulfills the following conditional expression (3A):

$$0.2 < (r11+r12)/(r11-r12) < 0.6 \qquad (3A)$$

Further, it is preferable that the image taking lens according to the present invention fulfills the following expression (4):

$$-10 < (r21+r22)/(r21-r22) < -1 \qquad (4)$$

Where, r21 represents a curvature radius of the object side surface of the second lens on the object side, and r22 represents a curvature radius of the object side surface of the second lens.

The aforesaid conditional expression (4) is provided to specify a form of the second lens, and is provided, in particular, to keep an appropriate balance between an optical performance and manufacture error sensitivity.

When the value of the conditional expression (4) exceeds its lower limit, it acts advantageously for manufacture error sensitivity and a total length of the image taking lens is not increased. When the value of the conditional expression (4) is lower than its upper limit, the total length of the image taking lens is shortened, and manufacture error sensitivity becomes appropriate and deterioration of aberration is properly restrained.

Further, The image taking lens according to the present invention fulfills the following conditional expression (4A):

$$-5 < (r21+r22)/(r21-r22) < -2 \qquad (4A)$$

Further, it is preferable that the image taking lens according to the invention fulfills the following conditional expression (5):

$$0.07 < D3/f < 0.3 \qquad (5)$$

Where, D3 represents a thickness of the third lens on the axis, and f represents a focal length of the total system of the image taking lens.

The aforesaid conditional expression (5) is a condition concerning a thickness of the third lens on the axis.

When the value of the conditional expression (5) exceeds its lower limit, the total length of the image taking lens is shortened, and it reduces concerning about remarkable deterioration of aberration, especially, distortion aberration and field curvature. When the value of the conditional expression (5) is lower than its upper limit, advantageous optical performance is realized without increasing a total length of the image taking lens.

Further, it is preferable that the image taking lens according to the present invention fulfills the following conditional expression (5A):

$$0.1 < D3/f < 0.2 \qquad (5A)$$

It is preferable that the first lens is a glass lens in the image taking lens of the present embodiment. It restrains fluctuations of the focus position caused by temperature changes to be minimum, and maintains high performance can in a broad range of temperature.

Further, the image taking lens of the present embodiment may be provided with a refractive index distributed lens in which the refractive index is gradated within the medium, but the image taking lens is more preferably provided with homogeneous material. When the three lenses are made by the use of homogeneous material, the image taking lens can be provided at a more moderate price.

EXAMPLES

Examples of the present embodiment will be shown more specifically as follows, referring to construction data and aberration diagrams.

In the Examples 1 and 2 given below, lens arrangements correspond respectively to FIG. 1 and FIG. 2 as described above.

In each examples, ri (i=1, 2, 3, . . . ) represents a curvature radius of $i^{th}$ surface numbered from the object side, i (i=1, 2, 3, . . . ) represents an $i^{th}$ distance between axial surfaces numbered from the object side, and Ni (i=1, 2, 3, . . . ) and vi (i=1, 2, 3, . . . ) respectively represent refractive index for d line and Abbe's number of $i^{th}$ lens. Further, f represents a focal length of the total system of the image taking lens and FNO represents an f-number.

Incidentally, a character D which follows data in the examples indicates an exponent. For example, it indicates $1.0 \times 10^{-2}$ in the case of 1.0D-02.

Further, in each numerical value example, a surface marked with * which follows the curvature radius ri shows that it is a surface having a refractive function equivalent to that of an aspheric-surface-shaped refractive optical surface or that of an aspheric surface, and a surface form of that aspheric surface is expressed by the following expression (AS):

$$X(H) = C \cdot H^2 / \{1 + (1 - \epsilon \cdot C^2 \cdot H^2)^{1/2}\} + \Sigma Ai \cdot Hi \quad (AS)$$

Where, H represents a height in the direction perpendicular to the optical axis, X(H) represents a displacement amount in the optical axis direction at the position of height H (whose origin is placed at the surface vertex), C represents a paraxial curvature, $\epsilon$ represents a quadratic surface parameter, Ai represents $i^{th}$ order aspheric surface coefficient and Hi represents a mark showing $i^{th}$ power of H.

TABLE 1

<<Example 1>>
f: 5.074(mm)
FNO: 3.0

| | Curvature radius (mm) | | Axial distance (mm) | | Refractive index: Nd | | Abbe's number: vd |
|---|---|---|---|---|---|---|---|
| r1 | ∞ | d1 | 0.050 | | | | |
| r2* | 3.995 | d2 | 1.430 | N1 | 1.58332 | v1 | 59.10 |
| r3* | −2.380 | d3 | 0.457 | | | | |
| r4* | −1.047 | d4 | 0.770 | N2 | 1.58340 | v2 | 30.23 |
| r5* | −2.001 | d5 | 0.769 | | | | |
| r6* | 2.037 | d6 | 0.735 | N3 | 1.53048 | v3 | 55.72 |
| r7* | 1.718 | d7 | 1.028 | | | | |
| r8 | ∞ | d8 | 0.600 | N4 | 1.51680 | v4 | 64.20 |
| r9 | ∞ | | | | | | |

Aspheric surface coefficient of the surface numbered from the object side

TABLE 1-continued

Second surface

| C | 1/3.995 |
|---|---|
| ε | 0.19129 D+01 |
| A4 | −0.22756 D−01 |
| A6 | −0.15063 D−01 |
| A8 | 0.19924 D−01 |
| A10 | −0.17489 D−01 |

Third surface

| C | −1/2.380 |
|---|---|
| ε | −0.3000 D+01 |
| A4 | −0.22938 D−01 |
| A6 | −0.28906 D−01 |
| A8 | 0.26844 D−01 |
| A10 | −0.10292 D−01 |

Fourth surface

| C | −1/1.047 |
|---|---|
| ε | −0.21357 D+01 |
| A4 | 0.38501 D−01 |
| A6 | 0.15331 D−01 |
| A8 | −0.15890 D−01 |
| A10 | 0.67469 D−02 |
| A12 | −0.18692 D−02 |

Fifth surface

| C | −1/2.001 |
|---|---|
| ε | 0.0 |
| A4 | 0.13157 D+00 |
| A6 | −0.99539 D−02 |
| A8 | −0.43468 D−02 |
| A10 | 0.16766 D−02 |
| A12 | −0.16551 D−03 |

Sixth surface

| C | 1/2.037 |
|---|---|
| ε | −0.40000 D+01 |
| A4 | −0.18416 D−01 |
| A6 | 0.79243 D−03 |
| A8 | −0.81218 D−04 |
| A10 | 0.36325 D−04 |
| A12 | −0.12304 D−04 |

Seventh surface

| C | 1/1.718 |
|---|---|
| ε | −0.39529 D+01 |
| A4 | −0.28443 D−01 |
| A6 | 0.59756 D−02 |
| A8 | −0.15780 D−02 |
| A10 | 0.22678 D−03 |
| A12 | −0.15641 D−04 |

TABLE 2

<<Example 2>>
f: 5.073(mm)
FNO: 3.0

| | Curvature radius (mm) | | Axial distance (mm) | | Refractive index: Nd | | Abbe's number: vd |
|---|---|---|---|---|---|---|---|
| r1 | ∞ | d1 | 0.050 | | | | |
| r2* | 4.062 | d2 | 1.437 | N1 | 1.58332 | v1 | 59.10 |
| r3* | −2.192 | d3 | 0.432 | | | | |
| r4* | −1.000 | d4 | 0.767 | N2 | 1.58340 | v2 | 30.23 |
| r5* | −1.857 | d5 | 0.851 | | | | |
| r6* | 2.469 | d6 | 0.726 | N3 | 1.53048 | v3 | 55.72 |
| r7* | 1.933 | d7 | 0.976 | | | | |
| r8 | ∞ | d8 | 0.600 | N4 | 1.51680 | v4 | 64.20 |
| r9 | ∞ | | | | | | |

Aspheric surface coefficient of the surface numbered from the object side

TABLE 2-continued

| | Second surface | |
|---|---|---|
| C | 1/4.062 | |
| ε | 0.20000 D+01 | |
| A4 | −0.22771 D−01 | |
| A6 | −0.17162 D−01 | |
| A8 | 0.20494 D−01 | |
| A10 | −0.17088 D−01 | |
| | Third surface | |
| C | −1/2.192 | |
| ε | −0.30000 D+01 | |
| A4 | −0.15414 D−01 | |
| A6 | −0.40592 D−01 | |
| A8 | 0.37425 D−01 | |
| A10 | −0.13905 D−01 | |
| | Fourth surface | |
| C | −1/1.000 | |
| ε | −0.22366 D+01 | |
| A4 | 0.58798 D−01 | |
| A6 | −0.31382 D−02 | |
| A8 | −0.14910 D−01 | |
| A10 | 0.15981 D−01 | |
| A12 | −0.60631 D−02 | |
| | Fifth surface | |
| C | −1/1.857 | |
| ε | 0.0 | |
| A4 | 0.17533 D+00 | |
| A6 | −0.36320 D−01 | |
| A8 | −0.17964 D−02 | |
| A10 | 0.56171 D−02 | |
| A12 | −0.14262 D−02 | |
| | Sixth surface | |
| C | 1/2.469 | |
| ε | −0.22307 D+01 | |
| A4 | −0.20305 D−01 | |
| A6 | 0.19030 D−03 | |
| A8 | −0.36924 D−04 | |
| A10 | 0.51594 D−04 | |
| A12 | −0.11871 D−04 | |
| | Seventh surface | |
| C | 1/1.933 | |
| ε | −0.40000 D+01 | |
| A4 | −0.24271 D−01 | |
| A6 | 0.50564 D−02 | |
| A8 | −0.16161 D−02 | |
| A10 | 0.25097 D−03 | |
| A12 | −0.16746 D−04 | |

Figure 3:
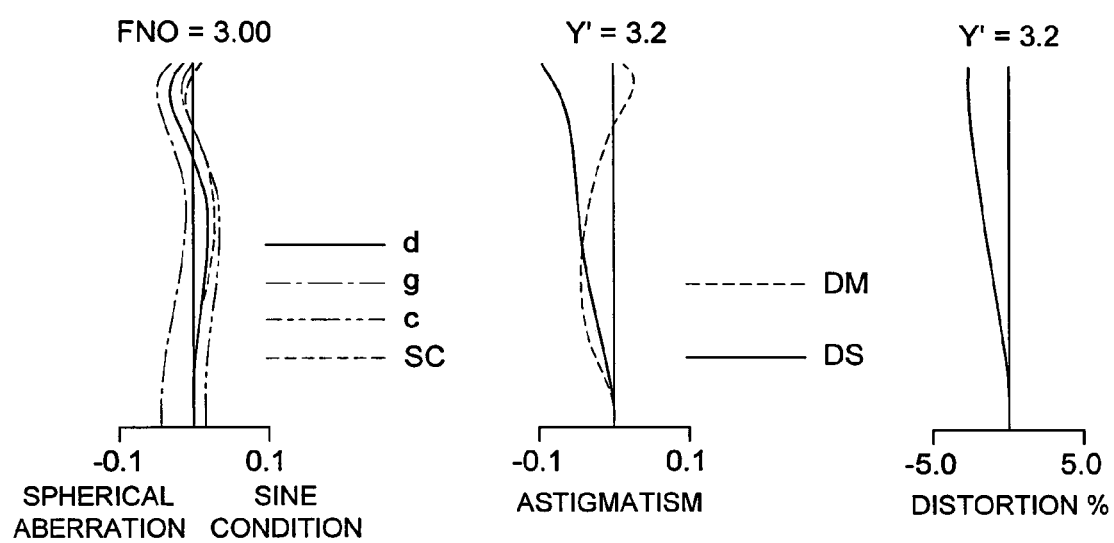
FIG. 3 is a diagram showing various aberrations in Example 1.
Figure 4:
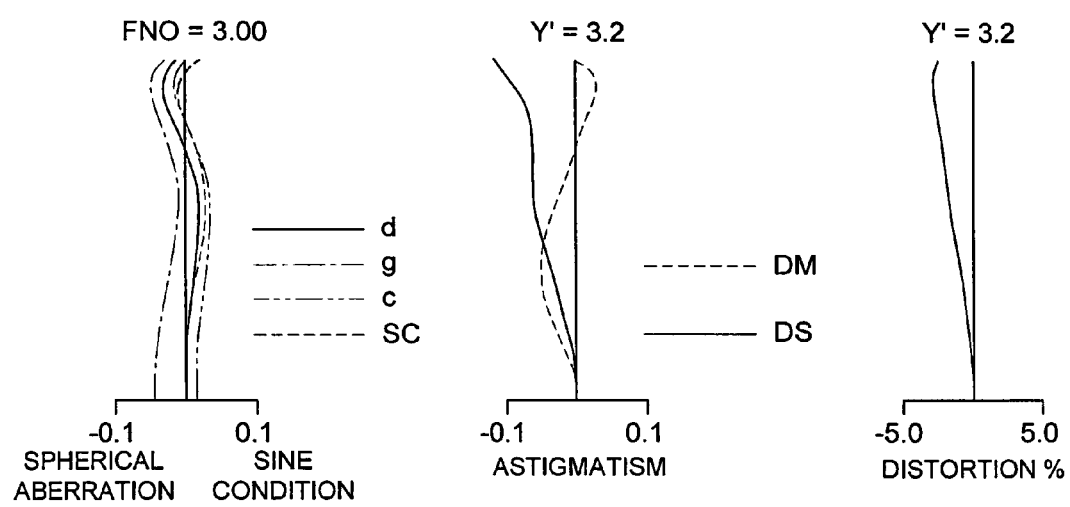
FIG. 4 is a diagram showing various aberrations in Example 2.

FIGS. 3 and 4 show aberration diagrams corresponding to Examples 1 and 2. Each aberration diagram indicates a spherical aberration diagram, an astigmatism and a distortion diagram in sequence from the left side.

In each spherical aberration diagram, solid line (d) shows a spherical aberration amount (mm) for a d line, one-dot chain line (g) shows a spherical aberration amount (mm) for a g line and two-dot chain line (c) shows a spherical aberration amount (mm) for a c line, and SC represents a an amount of the offence against the sine condition (mm).

In each astigmatism diagram, solid line (DS) shows a sagittal surface and dotted line (DM) shows an each astigmatism amount (mm) for a d line on a meridional surface.

In each distortion diagram, a solid line indicates distortion (%) for a d line.

The ordinate axis in the spherical aberration diagram indicates F number (FNO) of a light flux, and the ordinate axis for each of the astigmatism diagram and the distortion diagram indicates maximum image height Y' (mm).

Values corresponding to parameters prescribed with respective conditional expressions (1), (2), (3), (4) and (5) in each example are shown in the following Table together.

TABLE 3

Conditional Expression Correspondence

| Conditional expression | (1) f/f3 | (2) f2/f3 | (3) (r11 + r12)/(r11 − r12) | (4) (r21 + r22)/(r21 − r22) | (5) D3/f |
|---|---|---|---|---|---|
| Example 1 | −0.05 | 0.05 | 0.25 | −3.20 | 0.145 |
| Example 2 | −0.16 | 0.18 | 0.30 | −3.33 | 0.143 |

What is claimed is:

1. An image taking lens forming an optical image on an solid-state image pickup element, the image taking lens comprising, in order from an object side thereof:

an aperture stop;
a first lens with a positive power;
a second lens with a negative power; and
a third lens with a negative power,
wherein the third lens comprises an image side surface in an aspheric shape such that a region around an optical axis in the aspheric shape is formed in a concave shape facing an image side of the image taking lens and a peripheral region in the aspheric shape surrounding the region around the optical axis is formed in a convex shape facing the image side of the image taking lens, and
the image taking lens fulfills a following conditional formula:

$$-0.48 < f/f3 < -0.02,$$

where f is a focal length of a total system of the image taking lens, and
f3 is a focal length of the third lens.

2. The image taking lens of claim 1, wherein the first lens is a glass lens.

3. The image taking lens of claim 1, wherein each of the first lens, the second lens and the third lens comprises a homogeneous material.

4. An image taking lens forming an optical image on an solid-state image pickup element, the image taking lens comprising, in order from an object side thereof:

a first lens with a positive power;
a second lens with a negative power; and
a third lens with a negative power,
wherein the third lens comprises an image side surface in an aspheric shape such that a region around an optical axis in the aspheric shape is formed in a concave shape facing an image side of the image taking lens and a peripheral region in the aspheric shape surrounding the region around the optical axis is formed in a convex shape facing the image side of the image taking lens, and
the image taking lens fulfills following conditional formulas:

$$0.01 < f2/f3 < 0.29,$$

$$0.1 < (r11 + r12)/(r11 - r12) < 1.0,$$

where f2 is a focal length of the second lens,
f3 is a focal length of the third lens,
r11 is a curvature radius of an object side surface of the first lens and r12 is a curvature radius of an image side surface of the first lens.

5. The image taking lens of claim 4, further comprising:

an aperture stop arranged at a closer position to an object side of the image taking lens than a position of the first lens.

6. The image taking lens of claim 4,
wherein the first lens is a glass lens.

7. The image taking lens of claim 4,
wherein each of the first lens, the second lens and the third lens comprises a homogeneous material.

\* \* \* \* \*